Figure 1:
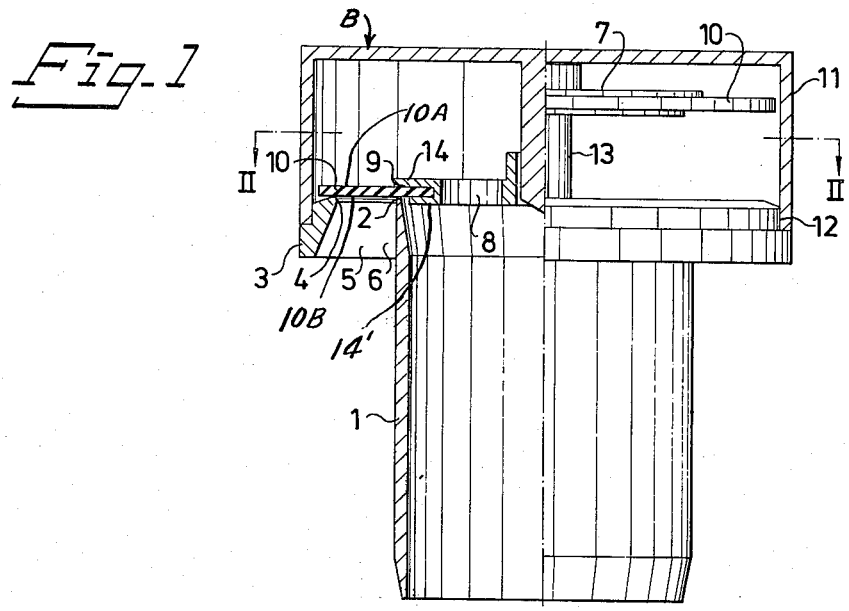

United States Patent
Persson

[11] 3,923,081
[45] Dec. 2, 1975

[54] AIR VALVE HAVING AN ANNULAR MOVABLE VALVE ELEMENT OF ELASTOMERIC MATERIAL

[75] Inventor: Bengt Arne Persson, Djursholm, Sweden

[73] Assignee: B. A. Installationsutveckling AB, Djursholm, Sweden

[22] Filed: Oct. 9, 1974

[21] Appl. No.: 513,312

[30] Foreign Application Priority Data
Oct. 15, 1973 Sweden............................ 73139842

[52] U.S. Cl. ................................................ 137/217
[51] Int. Cl.² .......................................... F16K 24/02
[58] Field of Search ......................... 137/215–218, 137/525, 525.3, 512.4, 516.11, 516.13, 516.17

[56] References Cited
UNITED STATES PATENTS

| | | | |
|---|---|---|---|
| 2,730,117 | 1/1956 | Svirsky | 137/217 |
| 2,747,609 | 5/1956 | Sekera | 137/525.3 X |
| 3,025,870 | 3/1962 | Mackey | 137/217 |

*Primary Examiner*—Henry T. Klinksiek
*Attorney, Agent, or Firm*—Bruns, Doane, Swecker & Mathis

[57] ABSTRACT

An air valve is disclosed suitable for relieving a vacuum in a pipe and preventing the escape of fluid therefrom. The valve includes a body having an inner chamber, an air inlet with inner and outer concentrically spaced valve seats, an opening for cummunicating the chamber witha pipe, and a stationary guide element. A valve element is displaceably mounted in the chamber and is normally urged to a closed position while being shiftable to an open position in response to a vacuum in the pipe. The valve element includes an annular disc of elastomeric material, and a hub mounted for axial movement along the guide element. The hub includes holes communicating the opening with the chamber and with an inner side of the disc when the valve element is in its open and closed positions. Thus, a vacuum at the opening is transmitted through the holes to the inner side of the disc to urge the disc open, and the absence of a vacuum or positive pressure, at the opening causes the disc to close. The hub includes a flange upon which an inner edge of an outer disc side sits usuch that the disc is cantilevered outwardly from the hub. This flange terminates short of the inner valve seat such that inthe valve-closed position, the outer disc side sealingly engages the inner and outer valve seats to prevent escape of fluid from the opening.

4 Claims, 2 Drawing Figures

U.S. Patent  Dec. 2, 1975  3,923,081

AIR VALVE HAVING AN ANNULAR MOVABLE VALVE ELEMENT OF ELASTOMERIC MATERIAL

The present invention relates to an air valve intended for connection to a pipe in which the presence of a partial vacuum is to be substantially completely eliminated by the introduction of outside air to the pipe by means of the valve, which is provided with an annular movable valve element of elastomeric material, on the one side of which is the pressure in a valve chamber communicating with the pipe via the opening in the middle portion of the valve element, the other side of which, when in engagement with a valve seating is arranged to close an inlet opening for the outer air, has atmospheric pressure working against the effect of a force biasing the valve element in a direction towards the valve seat. The air valve is primarily intended to open automatically and let in air to a waste pipe system for eliminating the occurrence of partial vacuum while being completely closed and sealed when partial vacuum is not present.

To function well, the waste pipe system must be provided with an air intake, since waste water flows through unfilled pipes and thereby entrains air. Without an air intake, the partial vacuum would be so large that the water traps would be sucked out, whereafter the sewer gas would have free access to surrounding rooms. Conventionally, the air intake is arranged with an air intake pipe terminating above the roof. Hereby the inconvenience arises during winter that water vapour streaming out from the air intake pipe condenses and forms ice or frost at the outlet so that air intake is sometimes prevented. This situation can be circumvented by having the air intake terminated by an automatic valve indoors, which may be done on the condition that the valve is made with satisfactory functional reliability. By terminating the pipe indoors, large economies are gained by simpler pipework and building work, while eliminating the risk of roof leakage.

The air valve shall normally be completely closed, opening first of all when the partial vacuum amounts to about 50 Pa. It must have large capacity at small negative pressures in order to suite waste systems where water traps with 50 mm closing depth are to be protected. The amount of air which is conveyed when sluicing can reach 30 times the amount of sluicing liquid, and taking into account that the pressure difference may not exceed 500 Pa it is obvious that the air valve must not cause any constriction of the area.

A known air valve for this purpose and of the kind set forth in the introduction is disclosed in the Swedish Pat. No. 325,237. The movable valve element consists here of a flexible annular diaphragm the outer edge of which is sealingly attached to a lid of the valve and the inner edge portion of which normally engages with the preferably kinfe-edged upper edge of ventilation opening, the diaphragm normally engaging with the ventilation opening through the action of a weight. For the valve to function properly it is important that the diaphragm is well centered and fitted, which is difficult to do for the reason, amongst others, that the diaphragm is inaccessible for inspection after the assembly of the valve. A further disadvantage is that the opening area between the diaphragm and the ventilation opening is very limited in spite of the valve being given large radial dimensions.

Other known air valves are provided with a spring biased valve disk or disc or flap, which is pivotally mounted and normally kept pressed against a valve seat. A sealing engagement is intended to be brought about by having the valve disk provided with a packing of elastomeric material. It can meanwhile easily happen that the valve disk gets out of shape with time or gets into an oblique position, so that the packing is unable to seal against the valve seating under the action of the necessarily weak spring force.

The object of the invention is to provide a non-return valve of the kind given in the introduction, which is simpler but in spite of this more reliable than the above described known valves, and which does not stop functioning in the intended manner if the movable valve element or the valve seating should become somewhat out of true.

According to the invention this is achieved by the valve element consisting of an annular disk which is arranged freely cantilevering from a holed hub attached to the inner edge portion of the disk, the hub being axially and movably mounted on a guide in the valve, and that the valve seat consists of two concentric rings forming the outer air inlet, the inner and outer edge portions respectively of the valve disk engaging sealingly against the ends of the rings when the valve is in the closed position. The through-flow area does not need here to be limited by a limited amount of movement of the valve disk, since this movement can in practice be made arbitrarily large without difficulty. More exactly, it is the area between the concentric rings forming the valve seat which determines the through-flow area, which can clearly be given the necessary size without the dimensions of the air valve becoming unsuitably large. Furthermore, since the valve disk, made from elastomeric material, is arranged freely cantilevering from the hub, minor out-of-trueness of the disk or the valve seating will not affect the function of the valve disk to any noticeable degree.

According to a preferred embodiment of the air valve according to the invention, the inner of the two concentric rings constitutes the one end of a pipe stub, the other end of which is intended to be connected with the piping system with the pipe stub directed vertically upwards from it, while the outer of the concentric rings is arranged outside the pipe stub and connected with it by radial fixings, there being a cover upwardly enclosing the valve chamber preferably removably attached to the outer ring, and internally provided with a downwardly directed pin on which the hub of the valve disk is glidably mounted. Gravity by itself can thereby be utilized as a resetting force for the valve disk. The air valve can then only consist of three parts, of which one is the hub with the valve disk of elastomeric material, which normally rests on the two concentric rings and thus achieves an effective sealing against these without any great demands being made on manufacturing tolerances. Since the inlet opening for the outer air is furthermore situated outside the pipe stub, a large area for small radial dimensions of the air valve is obtained for the inlet opening.

Figure 2:
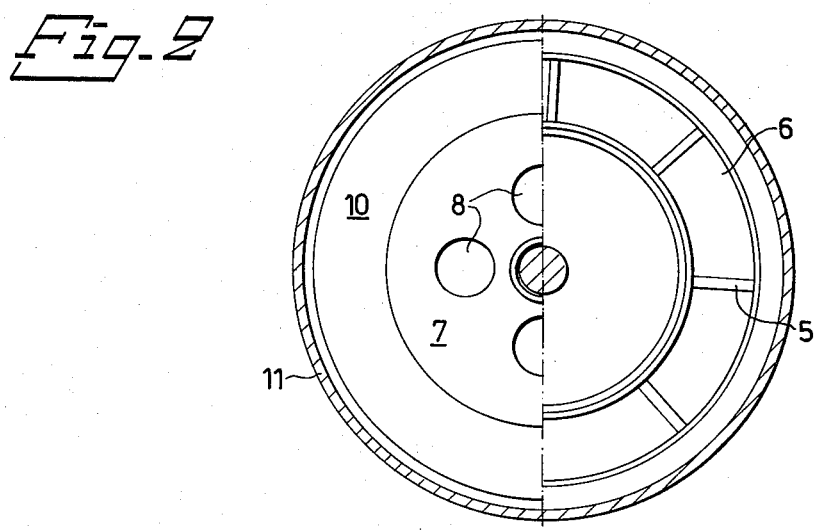

The invention will now be explained more clearly in the following while referring to the attached drawing, which shows an embodiment example of an air valve according to the invention, and on which FIG. 1 is a vertical view of the air valve, havinig the left half showing the valve in a closed position and in section, while the right half shows the valve in an open position, partly in section, and FIG. 2 is a cross section along the line II—II in FIG. 1.

The air valve shown on the drawing comprises a body B which includes pipe stub 1, the upper end of which is shaped as an inner valve seat 2. An outer ring 3 concentric with the pipe stub 1 and having a valve seat 4 is connected to the pipe stub 1 by radial fixings 5. The opening between the valve seats 2 and 4 and fixings 5 form an air intake 6 for outer air. The movable valve element of the air valve consists of a hub 7 with air holes 8, having at the circumference an annular recess 9, in which a valve disk 10 of elastomeric material is fitted. The disc has inner and outer sides 10A, 10B. In the illustrated embodiment, a cover 11 is removably seated in a recess 12 on the outer ring 3. The hub 7 is mounted axially movable on a guide 13 which projects downwards from the ceiling of cover 11.

The air valve is normally closed, whereat the valve disk 10 rests on the valve seats 2 and 4 through its own weight and that of the hub 7. The pressure in the pipe stub 1, which is intended to be connected to a pipe, is propagated through the air holes 8 to the upper side of the valve disk 10, so that an excess pressure presses the valve disk 10 against the valve seats 2 and 4.

When a partial vacuum in the pipe occurs, and attains about 50 Pa (pascal), the atmospheric pressure which acts on the underside of the valve disk 10 will lift the valve disk 10 with the hub 7 from the valve seats 2 and 4 so that air flows in through the air intake 6 and eliminates the partial vacuum. When the partial vacuum ceases, the hub 7 with the valve disk 10 reassumes its place on the valve seats 2 and 4.

The upper outer edge or flange 14 of the hub 7 has a somewhat larger diameter than the inner valve seating 2. The lower outer edge or flange 14' of the hub has a diameter less than the inner valve seat 2 (FIG. 1). The hub 7 via the valve disk 10 will hereby only rest on the inner valve seating 2. The elastomeric valve disk 10 will therefore be able to seal against the outer valve seat 4 even if a minor out-of-trueness should have occurred in these parts for some reason.

I claim:

1. An air valve connectable to a pipe to relieve a vacuum in said pipe while preventing the escape of fluid therefrom, said valve comprising:
    a body having:
        an inner chamber,
        air inlet means for communicating said inner chamber with the ambient atmosphere;
            said air inlet means including inner and outer concentrically spaced valve seats,
        opening means for communicating said chamber with a pipe, and
        a stationary guide element;
    a valve element displaceably mounted in said chamber, said valve element being normally urged to a valve-closed position and being shiftable to a valve-open position in response to a vacuum in said pipe, said valve element comprising:
        an annular disc formed of elastomeric material, said disc including an outer side facing said valve seats and an inner side facing said chamber,
        a hub mounted for axial movement along said guide element and having hole means communicating said opening means with said chamber and with said inner side of said disc, when said valve element is in both said valve-open position and said valve-closed position, so that a vacuum at said opening means is transmitted through said hole means to the inner side of said disc to urge said disc away from said inner and outer valve seats to said valve-open position and the absence of a vacuum at said opening means causes said disc to be urged toward said inner and outer valve seats to said valve-closed position;
        said hub including a flange upon which an inner edge of said outer side of said disc sits such that said disc is cantilevered outwardly from said hub, said outer flange terminating short of said inner valve seat such that in said valve-closed position said outer side of said disc sealingly engages said inner and outer valve seats to prevent fluid flow between said air inlet means and said opening means to prevent escape of fluid from said opening means.

2. Apparatus according to claim 1 wherein said hub includes an inner flange spaced from said outer flange in the direction of valve movement to define a recess in which said inner edge of said disc is received; said inner flange projecting further than said outer flange to support said inner side of said disc.

3. Apparatus according to claim 1 wherein said body is enclosed such that fluid flow is only permitted between said opening means and said air inlet means.

4. Apparatus according to claim 3 wherein said opening means is defined by a pipe-like stub, a proximate end of said stub defining said inner valve seat; a remote end of said stub being suitable for connection to the pipe, with the stub extending upwardly therefrom; said outer valve seat being connected by radial arms to said stub; said body including a cover enclosing said chamber and connected to a portion of said outer valve seat; said guide element being mounted on said outer valve seat; said guide element being mounted on said cover and extending downwardly toward said opening means; said hub having a central recess receiving said guide element.

* * * * *